(12) United States Patent
Jnawali et al.

(10) Patent No.: US 12,051,364 B2
(45) Date of Patent: Jul. 30, 2024

(54) ORGANIC LIGHT EMITTING DIODE (OLED) BURN-IN PREVENTION BASED ON STATIONARY PIXEL AND LUMINANCE REDUCTION

(71) Applicant: SAMSUNG ELECTRONICS CO., LTD., Suwon-si (KR)

(72) Inventors: Kamal Jnawali, Tustin, CA (US); Joonsoo Kim, Irvine, CA (US); Chenguang Liu, Tustin, CA (US); Chang Su, Foothill Ranch, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 18/143,266

(22) Filed: May 4, 2023

(65) Prior Publication Data

US 2023/0360595 A1  Nov. 9, 2023

Related U.S. Application Data

(60) Provisional application No. 63/339,243, filed on May 6, 2022.

(51) Int. Cl.
*G09G 3/20* (2006.01)
*G06T 5/40* (2006.01)
(Continued)

(52) U.S. Cl.
CPC ............ *G09G 3/3208* (2013.01); *G06T 5/40* (2013.01); *G06T 5/70* (2024.01); *G06V 20/41* (2022.01);
(Continued)

(58) Field of Classification Search
CPC ......... G09G 3/3208; G09G 2320/0233; G09G 2320/0257; G09G 2320/0266;
(Continued)

(56) References Cited

U.S. PATENT DOCUMENTS 8,659,617 B2   2/2014   Cho et al.
8,872,836 B2   10/2014  Rabii
(Continued)

FOREIGN PATENT DOCUMENTS

CN     111050224    4/2020
EP     1772849 B1   8/2012
(Continued)

OTHER PUBLICATIONS

U.S. Non-Final Office Action for U.S. Appl. No. 17/818,679 mailed May 9, 2023.
(Continued)

*Primary Examiner* — Abdul-Samad A Adediran
(74) *Attorney, Agent, or Firm* — Sherman IP LLP; Kenneth L. Sherman; Steven Laut

(57) ABSTRACT

One embodiment provides a computer-implemented method that includes receiving region information from a stationary region detection process for a video. A processor performs a flat region ghosting artifact removal process that updates the region information with a flat region indicator utilizing the region information and the video. The processor further performs a region based luminance reduction process utilizing the updated region information with the flat region indicator for display ghosting artifact removal and burn-in protection.

20 Claims, 7 Drawing Sheets

(51) Int. Cl.
 *G06T 5/70* (2024.01)
 *G06V 20/40* (2022.01)
 *G09G 3/3208* (2016.01)

(52) U.S. Cl.
 CPC ........... *G06T 2207/10016* (2013.01); *G06T 2207/10024* (2013.01); *G06V 2201/09* (2022.01); *G09G 2320/0233* (2013.01); *G09G 2320/0257* (2013.01); *G09G 2320/0266* (2013.01); *G09G 2320/046* (2013.01)

(58) Field of Classification Search
 CPC ............ G09G 2320/046; G06V 20/41; G06V 2201/09; G06T 5/002; G06T 5/40; G06T 2207/10016; G06T 2207/10024
 USPC ......................................................... 345/589
 See application file for complete search history.

(56) References Cited

U.S. PATENT DOCUMENTS

| | | | |
|---|---|---|---|
| 8,982,963 | B2 | 3/2015 | Gish et al. |
| 9,418,591 | B2 | 8/2016 | Kim et al. |
| 9,691,353 | B2 | 6/2017 | Joo et al. |
| 10,018,826 | B2 | 7/2018 | Nakatsuka |
| 10,402,952 | B2 | 9/2019 | Baar et al. |
| 10,706,774 | B2 | 7/2020 | Lee |
| 10,741,119 | B2 | 8/2020 | Zeng et al. |
| 10,885,384 | B2 | 1/2021 | Michael et al. |
| 11,006,151 | B2 | 5/2021 | Olivier et al. |
| 11,127,372 | B2 | 9/2021 | Kim et al. |
| 11,176,646 | B2 | 11/2021 | Tao et al. |
| 11,217,164 | B2 | 1/2022 | Kim et al. |
| 11,301,967 | B2 | 4/2022 | Peri et al. |
| 11,574,408 | B2 | 2/2023 | Bao et al. |
| 11,600,072 | B2 | 3/2023 | Russo et al. |
| 2008/0111886 | A1 | 5/2008 | Bai |
| 2014/0146071 | A1* | 5/2014 | Kim ................. G09G 3/3225 345/589 |
| 2016/0200254 | A1 | 7/2016 | Raab |
| 2018/0082625 | A1* | 3/2018 | Yang ................. G09G 3/3233 |
| 2019/0082138 | A1 | 3/2019 | Pan et al. |
| 2019/0238895 | A1 | 8/2019 | Thoreau et al. |
| 2020/0020303 | A1 | 1/2020 | Kim et al. |
| 2020/0090301 | A1 | 3/2020 | Kim et al. |
| 2020/0394772 | A1 | 12/2020 | Afra |
| 2021/0150812 | A1 | 5/2021 | Su et al. |
| 2021/0166360 | A1 | 6/2021 | Kim et al. |
| 2022/0020319 | A1 | 1/2022 | Lee |
| 2022/0028355 | A1 | 1/2022 | Chun et al. |
| 2023/0047673 | A1 | 2/2023 | Kim et al. |
| 2023/0050664 | A1 | 2/2023 | Jnawali et al. |
| 2023/0059233 | A1 | 2/2023 | Kim et al. |

FOREIGN PATENT DOCUMENTS

| | | |
|---|---|---|
| KR | 10-2017-0049241 A | 5/2017 |
| KR | 10-2019-0019438 A | 2/2019 |
| KR | 10-2019-0053036 A | 5/2019 |
| KR | 10-2020-0078293 A | 7/2020 |
| KR | 10-2279373 B1 | 7/2021 |
| KR | 10-2337829 B1 | 12/2021 |
| KR | 10-2348028 B1 | 1/2022 |

OTHER PUBLICATIONS

U.S. Final Office Action for U.S. Appl. No. 17/818,679 mailed Oct. 3, 2023.

Ahn, W. et al., "Flat-region detection and false contour removal in the digital TV display." 2005 IEEE International Conference on Multimedia and Expo, 2005, pp. 1-4, IEEE, United States.

Oh, E., et al. "Hierarchical Logo Detection and Image Processing Algorithm for Preventing OLED Image Sticking." SID Symposium Digest of Technical Papers, 2018, p. 643-646, vol. 49. No. 1.

Shin, H-K, et al. "A luminance control method for OLED burn-in prevention using user information." 2022 IEEE International Conference on Consumer Electronics, 2022, pp. 1-2, IEEE, United States.

Cozar, J.R., et al. "Logotype detection to support semantic-based video annotation." Signal Processing: Image Communication, Aug. 2007, pp. 669-679, vol. 22, Issues 7-8, Elsevier B.V., Netherlands.

Shin, Y.G., et al., "A novel burn-in potential region detection method using image processing technique", IEEE International Conference on Consumer Electronics (ICCE), Jan. 8, 2017, pp. 215-216, IEEE, United States.

Society of Motion Picture and Television Engineers, "D-Cinema Quality—Reference Projector and Environment", Apr. 6, 2011, RP 431-2:2011, New York {Abstract Only}.

International Telecommunications Union, "Parameter Values for Ultra-High Definition Television Systems for Production and International Programme Exchange", ITU-R rec. BT.2020-1, "Parameter Values for Ultra-High Definition Television Systems for Production and International Programme Exchange", Jun. 2014, pp. 1-8, Geneva, CH.

Kovaleski, R. et al., "High-quality reverse tone mapping for a wide range of exposures," SIBGRAPI, Aug. 26, 2014, pp. 49-56, United States.

Masia, B. et al., "Dynamic range expansion based on image statistics," Multimedia Tools and Applications, Jan. 2017, pp. 631-648, vol. 76, No. 1, United States.

Huo, Y. et al., "Physiological inverse tone mapping based on retina response," The Visual Computer, May 2014, pp. 507-517, vol. 30, No. 5, Springer {Abstract Only}.

Yang, X. et al. "Image correction via deep reciprocating HDR transformation," in Proceedings of the IEEE Conference on Computer Vision and Pattern Recognition (CVPR), Jun. 2018, pp. 1798-1807, IEEE, United States.

Kim, S. et al., "Learning the inverse tone mapping from low dynamic range video to high dynamic range displays using convolutional neural networks," Proceedings of the Asian Conference on Computer Vision (ACCV), Dec. 2, 2018, pp. 395-409, Springer, {Abstract Only}.

Kim, S. et al., "Deep SR-ITM: Joint learning of super-resolution and inverse tone-mapping for 4K UHD HDR applications," Proceedings of IEEE International Conference on Computer Vision (ICCV), 2019, pp. 3116-3125, IEEE, United States {Abstract Only}.

Wang, C. et al., "Deep inverse tone mapping for compressed images," IEEE Access, Jun. 5, 2019, pp. 74558-74569, vol. 7, IEEE, United States.

Eilertsen, G. et al., "HDR image reconstruction from a single exposure using deep CNNS," ACM Transactions on Graphics, Nov. 2017, pp. 1-15, vol. 36, No. 6, United States.

Santos, M. et al., "Single image HDR reconstruction using a CNN with masked features and perceptual loss," ACM Transactions on Graphics, Jul. 2020, pp. 1-10, vol. 39, No. 4, United States.

Ronneberger, O., et al., "U-net: Convolutional networks for biomedical image segmentation," in MICCAI, Oct. 5, 2015, pp. 234-241, Springer International Publishing Switzerland.

International Telecommunications Union, "Reference Electro-Optical Transfer Function for Flat Panel Displays used in HDTV Studio Production", Mar. 2011, pp. 1-7, Recommendation ITU-R BT.1886, Geneva, CH.

Glorot, X. et al., "Deep sparse rectifier neural networks," Proceedings of the Fourteenth International Conference on Artificial Intelligence and Statistics, 2011, pp. 315-323, v. 15, United States.

Clevert, D-A, et al., "Fast and accurate deep network learning by exponential linear units (ELUs)," ParXiv preprint arXiv:1511.07289, Nov. 23, 2015, pp. 1-14, United States.

Dang-Nguyen, DT., et al., "RAISE: A raw images dataset for digital image forensics," in Proceedings of the 6th ACM Multimedia Systems Conference, 2015, MMSys '15, p. 219-224, Association for Computing Machinery, New York, NY, United States, {Abstract Only}.

Wang, Z. et al., "Image quality assessment: from error visibility to structural similarity," IEEE Transactions on Image Processing, Apr. 2004, pp. 600-612, vol. 13, No. 4, IEEE, United States.

(56) References Cited

OTHER PUBLICATIONS

Banterle, F. et al., "Advanced High Dynamic Range Imaging", (2nd Edition), Jul. 2017, AK Peters (CRC Press), Natick, MA, USA.
Mantiuk, R. et al., "HDR-VDP-2: A calibrated visual metric for visibility and quality predictions in all luminance conditions", ACM Transactions on Graphics, Jul. 2011, pp. 40:1-40:13, vol. 30, No. 4, ACM.
International Search Report and Written Opinion dated Nov. 18, 2022 for International Application PCT/KR2022/012361, from Korean Intellectual Property Office, pp. 1-10, Republic of Korea.
International Search Report and Written Opinion dated Nov. 14, 2022 for International Application PCT/KR2022/012147, from Korean Intellectual Property Office, pp. 1-11, Republic of Korea.
U.S. Advisory Action for U.S. Appl. No. 17/818,679 mailed Jan. 17, 2024.
U.S. Non-Final Office Action for U.S. Appl. No. 17/818,679 mailed Feb. 13, 2024.

* cited by examiner

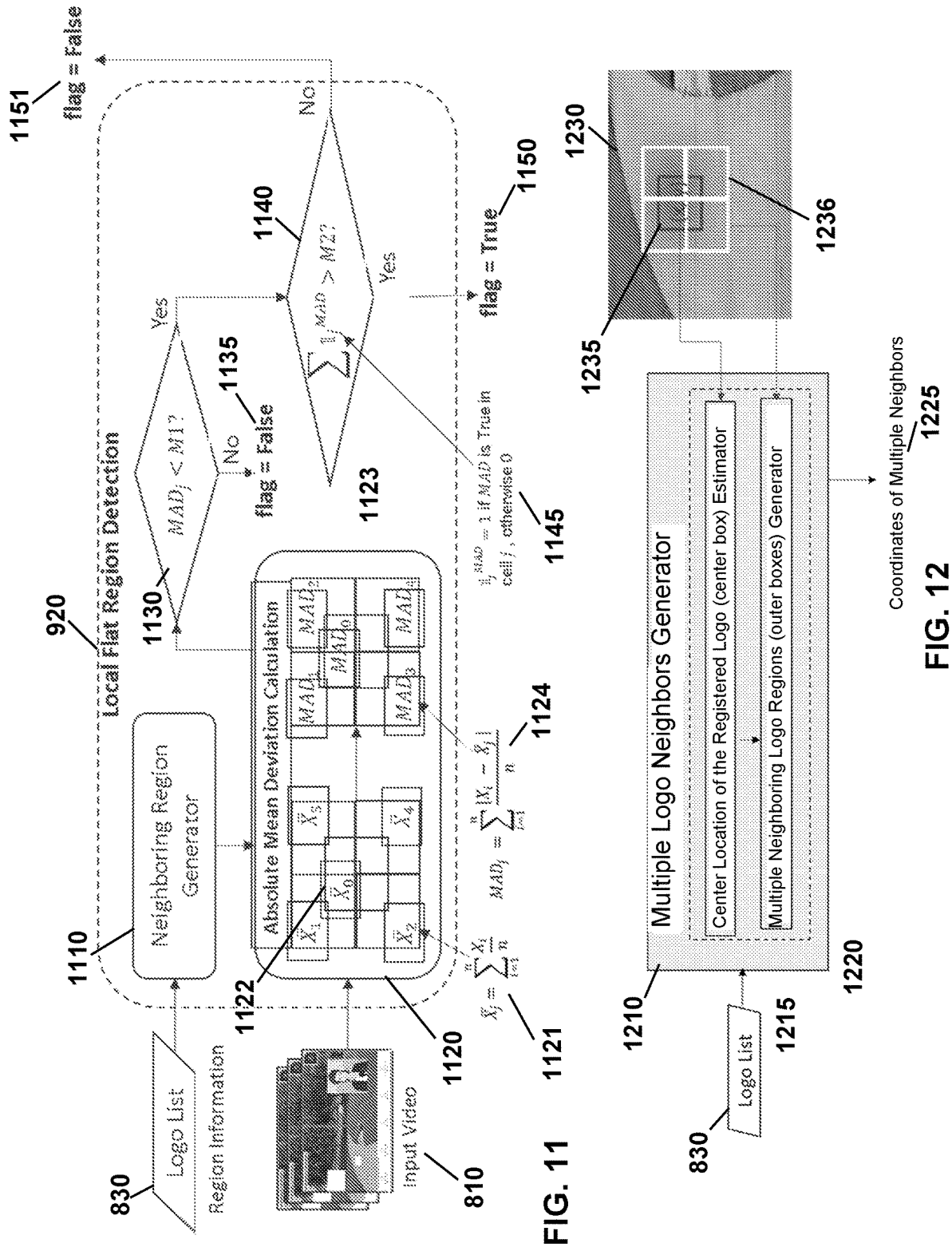

US 12,051,364 B2

ORGANIC LIGHT EMITTING DIODE (OLED) BURN-IN PREVENTION BASED ON STATIONARY PIXEL AND LUMINANCE REDUCTION

CROSS-REFERENCE TO RELATED APPLICATIONS

This application claims the priority benefit of U.S. Provisional Patent Application Ser. No. 63/339,243, filed May 6, 2022, which is incorporated herein by reference in its entirety. This application is related to application Ser. No. 17/818,681, filed on Aug. 9, 2022, which is incorporated by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to organic light emitting diode (OLED) display burn-in, and in particular, to OLED burn-in prevention based on stationary pixel and luminance reduction.

BACKGROUND

The OLED display has been recently used in many multimedia devices such as television (TV) and smart phones because it has shown better image contrast and lower power consumption than liquid crystal display (LCD) devices. The OLED display, however, has a major problem, referred to as OLED burn-in, which refers to a non-uniform deterioration pixel region and looks like image ghosting. Generally, the burn-in is generated by the bright stationary pixels. Since the burn-in not only rapidly reduces the lifetime of OLED panel but also causes image quality degradation, it has been a critical problem to be solved.

SUMMARY

One embodiment provides a computer-implemented method that includes receiving region information from a stationary region detection process for a video. A processor performs a flat region ghosting artifact removal process that updates the region information with a flat region indicator utilizing the region information and the video. The processor further performs a region based luminance reduction process utilizing the updated region information with the flat region indicator for display ghosting artifact removal and burn-in protection.

Another embodiment includes a non-transitory processor-readable medium that includes a program that when executed by a processor performs prevention of OLED display burn-in, including receiving, by the processor, region information from a stationary region detection process for a video. The processor performs a flat region ghosting artifact removal process that updates the region information with a flat region indicator utilizing the region information and the video. The processor further performs a region based luminance reduction process utilizing the updated region information with the flat region indicator for display ghosting artifact removal and burn-in protection.

Still another embodiment provides an apparatus that includes a memory storing instructions, and at least one processor executes the instructions including a process configured to receive region information from a stationary region detection process for a video, perform a flat region ghosting artifact removal process that updates the region information with a flat region indicator utilizing the region information and the video, and perform a region based luminance reduction process utilizing the updated region information with the flat region indicator for display ghosting artifact removal and burn-in protection.

These and other features, aspects and advantages of the one or more embodiments will become understood with reference to the following description, appended claims and accompanying figures.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 2 illustrates an example of OLED display burn-in;

FIG. 11 illustrates a block diagram for a local flat region detection process, according to some embodiments;

FIG. 12 illustrates an example process to generate multiple logo neighbors corresponding to a registered logo, according to some embodiments.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

A description of example embodiments is provided on the following pages. The text and figures are provided solely as examples to aid the reader in understanding the disclosed technology. They are not intended and are not to be construed as limiting the scope of this disclosed technology in any manner. Although certain embodiments and examples have been provided, it will be apparent to those skilled in the art based on the disclosures herein that changes in the embodiments and examples shown may be made without departing from the scope of this disclosed technology.

One or more embodiments relate generally to organic light emitting diode (OLED) display burn-in, and in particular, to OLED burn-in prevention based on stationary pixel and luminance reduction. One embodiment provides a computer-implemented method that includes receiving region information from a stationary region detection process for a video. A processor performs a flat region ghosting artifact removal process that updates the region information with a flat region indicator utilizing the region information and the video. The processor further performs a region based luminance reduction process utilizing the updated region information with the flat region indicator for display ghosting artifact removal and burn-in protection.

Figure 1:
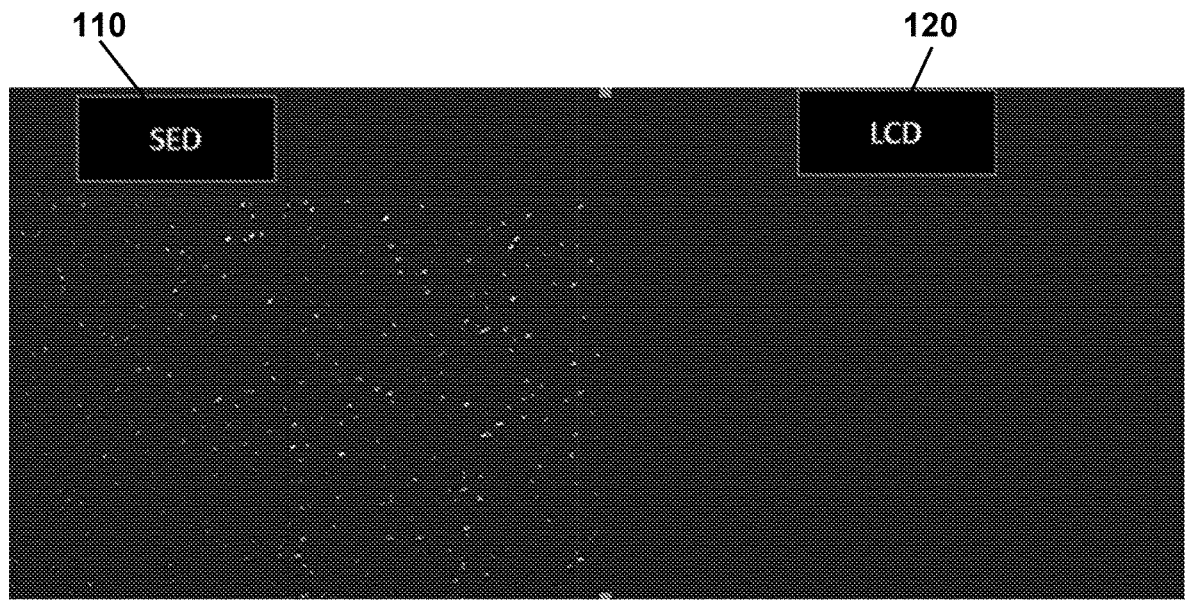
FIG. 1 illustrates the difference between a self-emitting display (SED)/organic light emitting diode (OLED) and liquid crystal display (LCD) technology.

FIG. 1 illustrates the difference between a self-emitting display (SED)/OLED and liquid crystal display (LCD) technology. Screens that use SED technology deliver the best image quality on TVs. SED technology gets more and more popular because it can show true black hence more contrast levels than LCD. For example, the SED technology display 110 (galaxy) shows the superiority of SED display technology over the LCD display 120 technology. OLED is becoming more popular because it can show true black, hence more contrast levels than LCD. OLED displays have been widely used in many multimedia devices such as TVs and smart phones because it has shown better image contrast and lower power consumption than LCD displays.

OLED burn-in refers to a non-uniform deterioration pixel region and looks like ghosting. Since the burn-in not only rapidly reduces the lifetime of OLED panels but also causes image quality degradation, it can be a critical problem that needs to be solved. Therefore, detecting the bright stationary pixels such as a logo(s) becomes a very important processing component so that luminance reduction can further be applied on the stationary region to slow down burn-in.

Figure 2:
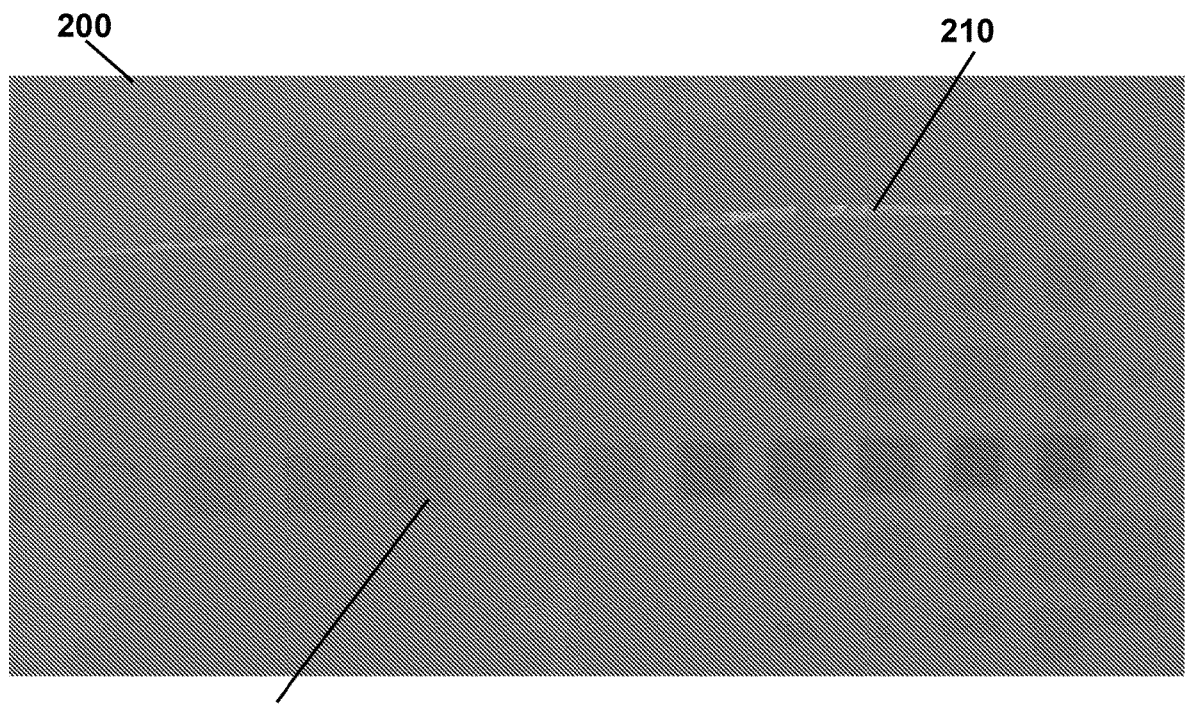

FIG. 2 illustrates an example of SED display 200 burn-in. SED screens suffer from a potential problem: burn-in. Burn-in refers to permanent image retention usually caused by a static image such as a channel logo/stationary region on the screen that remains for a longer period than dynamic images, and that remains as a ghostly background no matter what else appears on-screen. As shown, the example burn-in locations 210 and 220 on the SED display 200 appear as remnants or ghost images. Since the burn-in not only rapidly reduces the lifetime of SED panels but also causes image quality degradation, it can be a critical problem that needs to be solved.

In many cases, OLED screens also suffer from the potential problem of burn-in. Burn-in refers to permanent image retention usually caused by a static image such as a channel logo/stationary region on the display screen for a longer period, and that remains as a ghostly background no matter what else appears on-screen. A permanent retention of a logo can be due to permanent damage of individual SED pixels. This creates visually unpleasant images. The disclosed technology can prevent burn-in by reducing the luminance of a channel logo/stationary region on the screen to extend the life of OLED TVs without compromising visual qualities. Luminance reduction may be needed to extend the life of an OLED display system. However, it would be beneficial to be careful when choosing how to increase or decrease the luminance reduction ratio depending on the logo and its neighbors to maintain visual quality.

Figure 3:
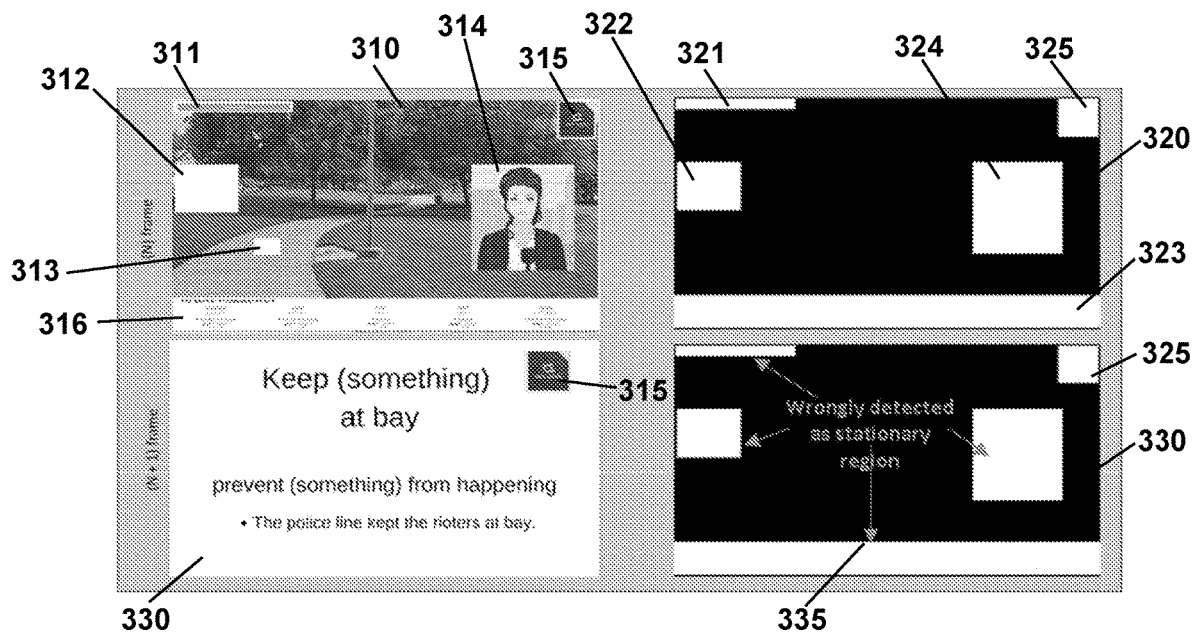
FIG. 3 illustrates two similar example generated maps due to a stationary region detection process on two consecutive frames, where image frame N is not flat and frame (N+1) is almost flat in terms of histogram distribution and mean absolute deviation.

FIG. 3 illustrates two similar example generated maps 310/330 due to a stationary region detection process on two consecutive frames, where image frame N (310/330) is not flat and frame (N+1) (320/330) is almost flat in terms of histogram distribution and mean absolute deviation. In map 310, the stationary (logo) regions are regions 311-316. In map 330, the stationary regions is 315. The same five stationary (logo) regions (311, 315, 316, two white patches 312 and 313)/static (woman face region 314) regions appear over the period of time T from 0 to N (N>F), with the (N+1) frame with only top-right logo 315; where N is a positive integer and F is the number of previous frames.

A luminance reduction of pixels is required to extend the life of an OLED display system. The luminance reduction process uses a logo/static map generated by the stationary region detection process to reduce the luminance of pixels on the logo/static region. However, the stationary region detection process classifies the flat region at the corresponding logo on the previous frame as the same logo. That makes the luminance reduction process continue to reduce luminance on the flat region, and hence the image is severely degraded with ghosting artifacts, such as in regions 321-325 for map 320, and similar regions in map 330 that are indicated by the wrongly detected stationary regions 335. A ghosting artifact in a flat region is more obvious and it has more sensitivity to human vision.

The stationary detection process uses a MaxRGB feature to classify a region as a logo region (where MaxRGB represents the maximum value among Red, Green and Blue pixels as spatial information of each frame and stores a temporal minimum and a temporal maximum of the MaxRGB information to multiple buffers of each scene). When a global/local flat region appears in the next frame, however, the stationary detection process still assumes the flat region at the corresponding logo located in the previous frame as the same logo.

Figure 4:
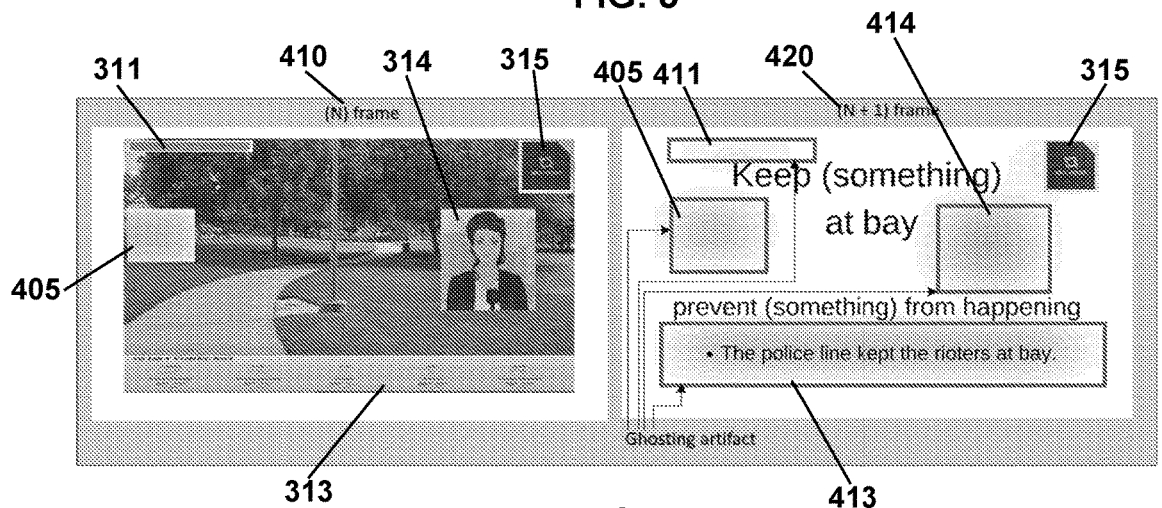
FIG. 4 illustrates an example of ghosting artifacts on a uniform region of an (N+1) frame.

FIG. 4 illustrates an example of ghosting artifacts on a uniform region of an (N+1) frame 420. Without a (global) flat region detection process, the luminance reduction process continues to reduce pixel intensity on a (global) flat region and hence the picture quality is severely degraded with ghosting artifacts 405, 411, 413 and 414 on a uniform region of the (N+1) frame 420. The stationary region detection process continues to detect logo regions even though there is only one logo region 315 in the (N+1) frame 420, and hence the luminance reduction process continues to reduce brightness on the respective regions for ghosting artifacts. This is because the stationary detection process uses the MaxRGB feature to generate a logo map, and the boxes outlining the logo regions 311, 405, 313 and 314 on the Nth frame 410 and 405, 411, 413 and 414 on the (N+1)th frame 420 correspond to the same features. In some embodiments, a global flat region detection process is implemented for ghosting artifact removal because the ghosting artifact in the global flat zone is more noticeable and more sensitive to the human eye.

Figure 5:
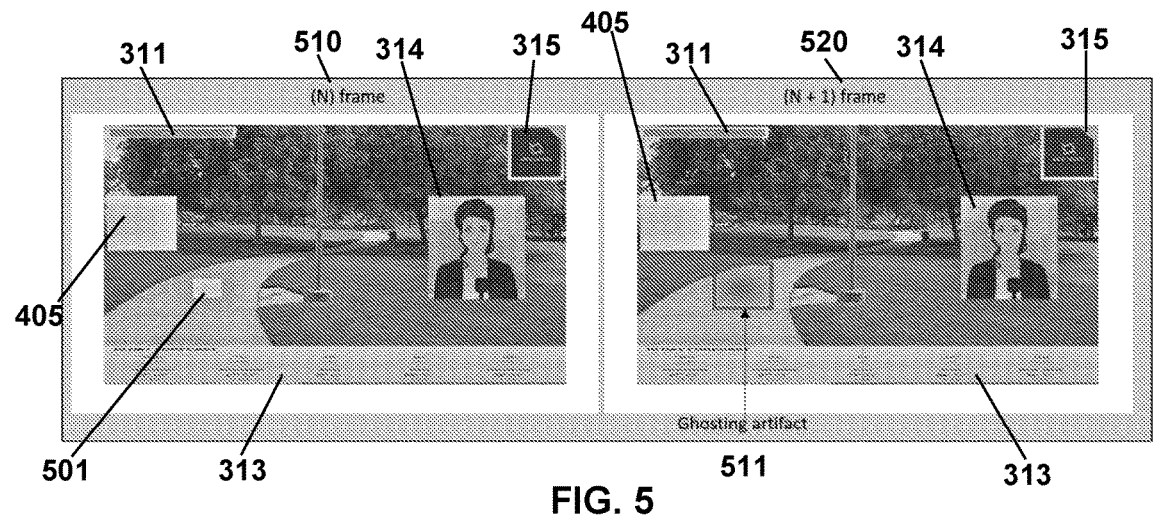
FIG. 5 illustrates an example of a ghosting artifact on a flat (on road) region of an (N+1)

FIG. 5 illustrates an example of a ghosting artifact 511 on a flat (on road) region of an (N+1) frame 520. Without a (local) flat region detection process, the luminance reduction process continues to reduce pixel intensity on a (local) flat region 501 and hence the picture quality is severely degraded with a ghosting artifact 511 as shown on a flat (on road) region of the (N+1) frame 520. The stationary region detection process continues to detect six logo regions (311, 313, 314, 315, 405 and 501) in the N frame 510 even though there are only five logo regions (311, 314, 315, 405 and 511) in the (N+1) frame 520. Thus the luminance reduction process continues to reduce pixels on six logo regions. Because the ghosting artifact 511 on the local flat region is more obvious and it has more sensitivity to human vision, in some embodiments the present technology includes a local flat region detection process for ghosting artifact removal.

Figure 6:
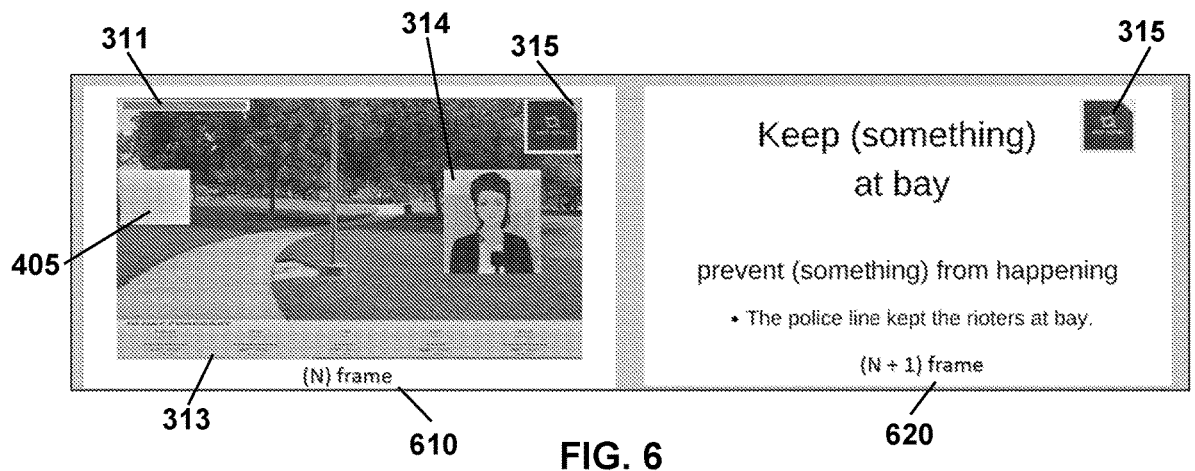
FIG. 6 illustrates an expected output for an (N+1) frame, according to some embodiments.

FIG. 6 illustrates an expected output for an (N+1) frame 620, according to some embodiments. In some embodiments, using a (global) flat region detection process, a ghosting artifact on an image may be avoided while using a luminance reduction process as shown in FIG. 6. Note that not only is the present technology able to extend the life of an OLED screen by reducing the luminance on a logo/static region, but is also able to remove a ghosting artifact. The global flat region is defined on an entire image where distribution of a histogram converges toward single pixel intensity. In one or more embodiments, a global flat region indicator, such as a detection flag (or equivalent) being set to a True value, provides for a luminance reduction process to skip luminance reduction of the pixels on the flat region. The addition of a flat region detection process is an improvement over just use of a luminance reduction process in terms of a ghosting artifact removal. In some embodiments, upon an indication that a global flat region is detected (e.g., a flat region detection flag is True, a bit is set to a first value, etc.), a luminance reduction process skips conducting brightness reduction on all local logo/static regions on the (N+1) frame 620 at the corresponding location of the logo regions (311, 313, 314, 315 and 405) in the N frame 610.

Figure 7:
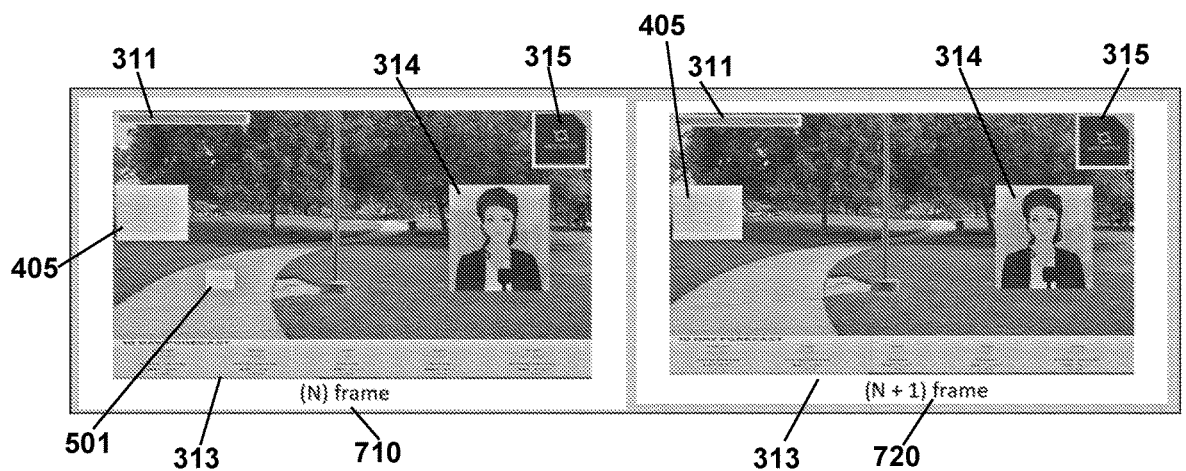
FIG. 7 illustrates an example of an expected output upon a local flat region detection indicator set to a first value, according to some embodiments.

FIG. 7 illustrates an example of an expected output (on an (N+1) frame 720) upon a local flat region detection indicator set to a first value (e.g., a flag is set to True, etc.), according to some embodiments. With a (local) flat region detection process, a ghosting artifact present on an image may be avoided while using a luminance reduction process. In one or more embodiments, not only is the processing able to extend the life of an OLED screen by reducing the luminance on a logo/static region, but is also able to avoid a ghosting artifact. The local flat region defined on a locally defined logo/static region (for example a section of road at log region 501 in the N frame 710) with no variation of pixel intensity. In some embodiments, if the local flat region detection indicator is set to a first value (e.g., a flag set to True, a bit set to a first value, etc.) the luminance reduction processing can skip performing pixel intensity reduction on the flat region. In terms of removing ghosting artifacts, the addition of flat region detection processing is an improvement over the prior luminance reduction process without use of the flat region detection processing.

Figure 8:
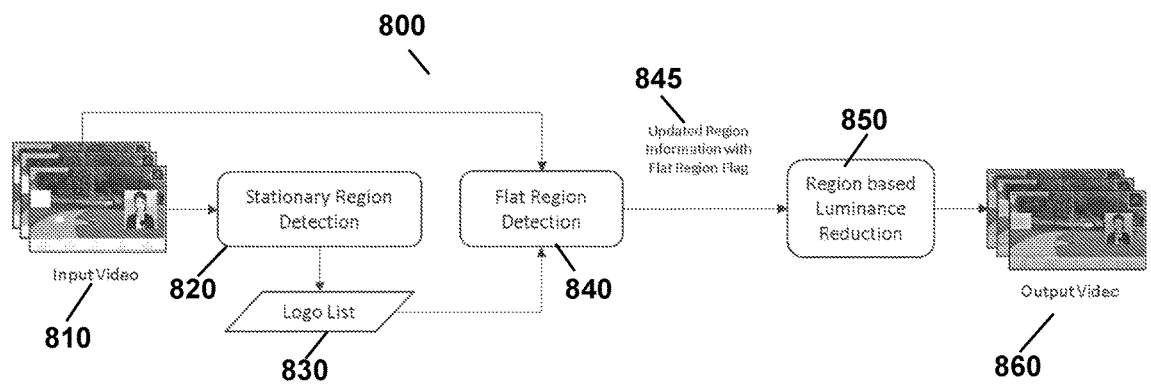
FIG. 8 illustrates a block diagram of an OLED burn-in prevention process, according to some embodiments.

FIG. 8 illustrates a block diagram of an OLED burn-in prevention process 800, according to some embodiments. The stationary detection technique classifies a region as a logo region using the MaxRGB characteristic. The stationary detection technique, however, continues to presume that the global/local flat region with the same color and intensity situated in the previous frame is the same logo. As a result, there will be a ghosting artifact when the brightness is reduced on a flat region. In some embodiments, to prevent ghosting artifacts in OLED display systems, a flat region detection process 840 is implemented. One or more embodiments, a real-time and computationally less expensive flat (global and/or local) region detection process 840 for ghosting artifacts removal is provided. In some embodiments, a computationally less expensive MaxRGB based histogram distribution for the global flat region detection processing for an OLED burn-in prevention is provided in real-time. Additionally, a local flat region detection processing provides a computationally less expensive real-time local flat region detection based on a mean absolute deviation of a logo and its neighbors (e.g., four neighbors surrounding the logo position) for an OLED burn-in prevention.

In some embodiments, after the input video 810 is received, the flat region detection process 840 performs processing in between the stationary region detection process 820, and the region based luminance reduction process 850, which is distinguishable from an OLED burn-in prevention process that only includes a stationary region detection process and a luminance reduction process. In some embodiments, the output of the stationary region detection process 820 and logo list 830 are provided to the flat region detection process 840. The output of the flat region detection process 840 includes updated region information and flat region indicator (e.g., a flag, a bit, etc.) 845 are provided to the region based luminance reduction process 850. The flat region detection process 840 sends flat region indicator (e.g., a flag with True/False value, at least one bit with 0/1 value, etc.) to the region based luminance reduction process 850. The result of the region based luminance reduction process 850 is the output video 860. In one or more embodiments, no brightness reduction occurs if the flat region indicator for a registered logo changes to a first value (e.g., a flag is set to True, a bit is set to one, etc.). The region based luminance reduction process, however, keeps applying luminance reduction if the indicator changes to a second value (e.g., a flag is set to False, a bit is set to zero, etc.).

Figure 9:
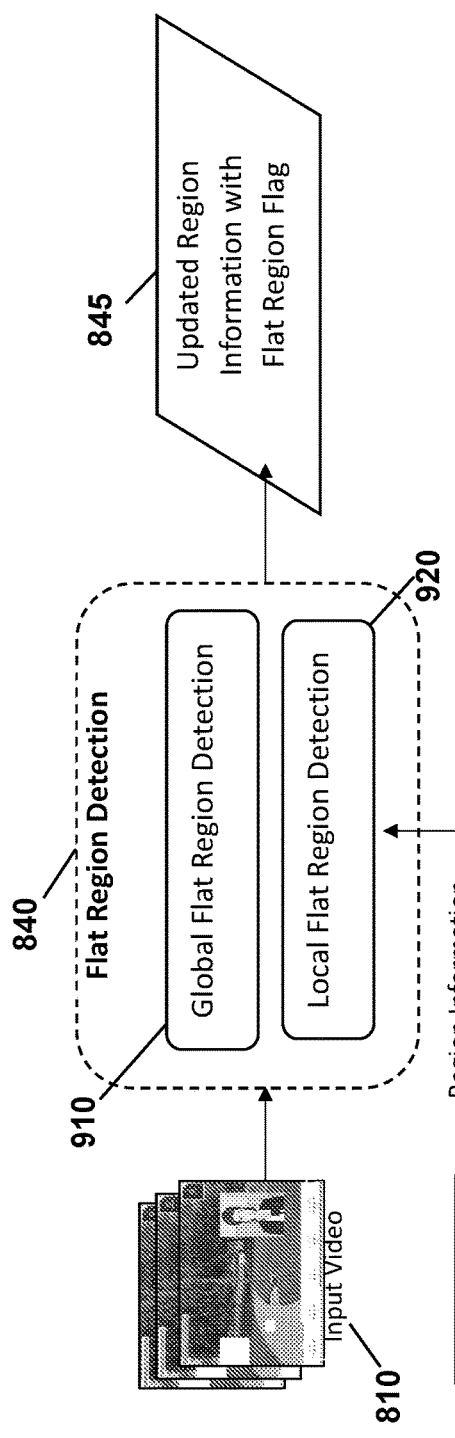
FIG. 9 illustrates an example block diagram of a flat region detection process, where output of logo detection along with an input image is fed into the flat region detection process and its output is fed into a luminance reduction process, according to some embodiments.

FIG. 9 illustrates an example block diagram of flat region detection process 840, where output of logo detection (logo list 830 and region information 905 from stationary region detection process 820, FIG. 8) along with an input image (input video 810) is fed into the flat region detection process 840 and its output (updated region information with a flat region indicator, e.g., a flag, a bit, etc.) is fed into a luminance reduction process (e.g., region based luminance reduction process 850, FIG. 8), according to some embodiments. Two blocks make up the flat region detection process 840: a global flat region detection process 910 and a local flat region detection process 920. In some embodiments, if the global flat region detection indicator is set to a first value (e.g., a flag is set to True, a bit is set to one, etc.), then the local flat region detection process 920 is skipped. If a global flat detection indicator becomes a second value (e.g., a flag is set to False, a bit is set to zero, etc.), processing continues to the local flat region detection process 920. The output of the flat region detection process 840 is the updated region information and flat region indicator 845 (e.g., a Flag, a bit, etc.).

Figure 10:
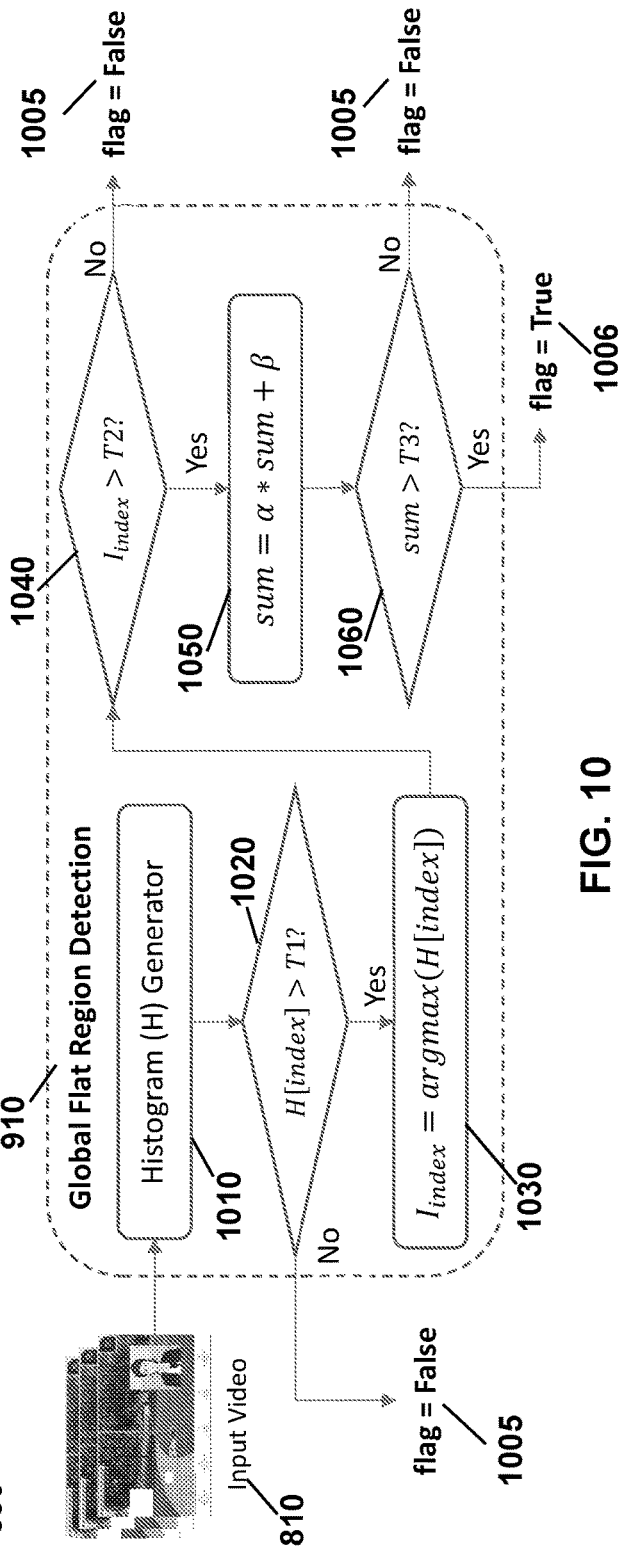
FIG. 10 illustrates an example block diagram of a global flat region detection process, according to some embodiments.

FIG. 10 illustrates an example block diagram of a global flat region detection process 910, according to some embodiments. In one or more embodiments, a histogram (H) generator 1010 creates an N-bin distribution of pixel intensity using the MaxRGB of the entire input frame from the input video 810. In some embodiments, the amount of MaxRGB pixels in each bin is counted, and if the count is more than T1 (a first threshold) in block 1020, processing proceeds on to block 1030 and provides an indicator set to a first value (e.g., sets a flag to True, a bit to one, etc.). Otherwise the indicator is set to a second value 1005 (e.g., set a flag to False, a bit to zero, etc.). In block 1040, if the index corresponding to a maximum bin count is greater than T2 (a second threshold), the indicator set to the first value is provided to block 1050, where the indicator set to the first value designates the entire frame as a global flat region. Otherwise, the indicator is set to the second value 1005 (e.g., set a flag to False, a bit to zero, etc.). The smoothing filter in block 1050 is then applied. The smoothing filter provides for a smoother transition from the global uniform frame to the consecutive non-global uniform frame, and vice versa. In some embodiments, in block 1060 if the sum is greater than T3 (a third threshold), the indicator is set to the first value 1006 and is provided to the region based luminance reduction process 850 (FIG. 8). Otherwise the indicator is set to the second value 1005 (e.g., set a flag to False, a bit to zero, etc.). If the indicator becomes the first value 1006, the region based luminance reduction process 850 assumes the entire frame is free from a logo(s), and recovers luminance back, which helps to avoid a ghosting artifact. Note that values of T1, T2, T3 may be provided from experimentally generated optimal values, use of machine learning, etc. It should be noted that if the indicator for the global flat region (i.e., the entire frame is a flat region) has the first value 1006, then processing skips performing luminance reduction on a locally detected logo/static region.

FIG. 11 illustrates a block diagram for the local flat region detection process 920, according to some embodiments. In one or more embodiments, the local flat region takes an image (input video 810) and a list of logo/static regions (logo list 830) as inputs. At first, the processing generates multiple (e.g., four, etc.) neighboring regions corresponding to the registered logo/static region using a neighboring region (logo) generator 1110. An absolute mean deviation estimator 1120 provides calculation for estimates of the mean deviation of the pixel intensity on the input image defined within the registered logo and its multiple neighbors. In some embodiments, at first, the processing calculates the mean pixel intensity defined within the registered logo (mean pixel intensity 1122) and its multiple neighbors (mean pixel intensity 1121). Then, the processing calculates the mean deviation of the registered logo and its multiple neighbors to generate five mean absolute deviations (MADs) (absolute mean deviation 1123, 1124) using corresponding mean values. It should be noted that in some embodiments the mean deviation is selected over a standard deviation for higher accuracy, and faster computation. MAD is less sensitive to outliers, whereas standard deviation is more sensitive to outliers because of the square operation. In block 1130, each of the MADs ($MAD_0$ 1123 and $MAD_{1-4}$ 1124) are compared with M1, which is a threshold for MAD. If each of the MADs are less than M1, then in block 1140 the processing counts all such MADs with subscript j defined by box 1145. Otherwise, if each of the MADs are not less than M1 in block 1130, the indicator is set to a second value 1135 (e.g., a flag is set False, a bit is set to zero, etc.). If the count of all MADs is greater than M2 (a second MAD threshold), the processing sets an indicator to a first value 1150 (e.g., a flag is set True, a bit is set to one, etc.), where the corresponding logo region is detected as a local flat region. Otherwise, the indicator is set to a second value 1151 (e.g., a flag is set False, a bit is set to zero, etc.). Note that values of M1 and M2 may be provided from experimentally generated optimal values, use of machine learning, etc.

FIG. 12 illustrates an example process 1210 to generate multiple (e.g., four, etc.) logo neighbors corresponding to a registered logo (from the logo list 830), according to some embodiments. In one or more embodiments, for the image frame 1230, at first the processing estimates the center location of the registered logo 1235 utilizing the center location of the registered log estimator 1215, and then uses the center location of the registered logo 1235 to generate multiple (e.g., four, etc.) logo neighbors 1236 utilizing the multiple neighboring logo regions generator 1220. Note that the length ($\tilde{L}$) of the neighboring bounding box ranges between $L/2 \leq \tilde{L} \leq L$, and the width ($\tilde{W}$) of the neighboring bounding box ranges between $W/2 \leq \tilde{W} \leq W$, where L, and W are the length, and width of the corresponding registered logo. If (x, y) is the center coordinate of the red box, there are two choices. For the first choice, when the box is well within the image frame 1230, the center coordinate of the box is given by (X−L/2, Y−W/2), where length becomes L. For the second choice, when the box 1236 is just outside of the boundary of the image frame 1230, (or the bounding box just on the boarder of box 1236 region), then the center coordinate of the box 1236 is given by (X−L/4, Y−W/4), where the length becomes L/2.

In some embodiments, the disclosed technology provides flat region detection and luminance reduction ratio recovery to improve visual quality during luminance reduction processing. The disclosed technology further provides local flat region detection processing. Additionally, the disclosed technology provides a mean deviation based flat region detection processing corresponding to each bounding box detection using a dynamic list structure. Further, the disclosed technology provides global flat region detection processing and a big-central-region detection process for the global flat region detection processing using a dynamic list structure. Still further, the disclosed technology provides efficient (e.g., fast) luminance reduction ratio recovery. Additionally, the disclosed technology applies fast luminance recovery to minimize dissimilarity on a flat region when a logo/static region starts to disappear. The fast luminance recovery can utilize a target limit buffer (TLB) for a quicker luminance recovery without introducing any temporal and spatial visual artifacts. The TLB keeps track of a luminance ratio corresponding to each logo/static region.

In some embodiments, the disclosed technology provides a hardware friendly global/local flat region detection system of an OLED-burn prevention process for ghost artifact/dissimilarity removal. The flat region based ghosting artifact removal processing provides OLED burn-in protection in real-time, and is a computationally less expensive flat (global and/or local) region detection process for ghosting artifacts removal. The global flat region detection process provides a computationally less expensive maxRGB based histogram distribution for OLED burn-in prevention in a real-time. The local flat region detection process provides a computationally less expensive real-time process based on a mean absolute deviation of a logo and its multiple (e.g., four, etc.) neighbors for OLED burn-in prevention.

Figure 13:
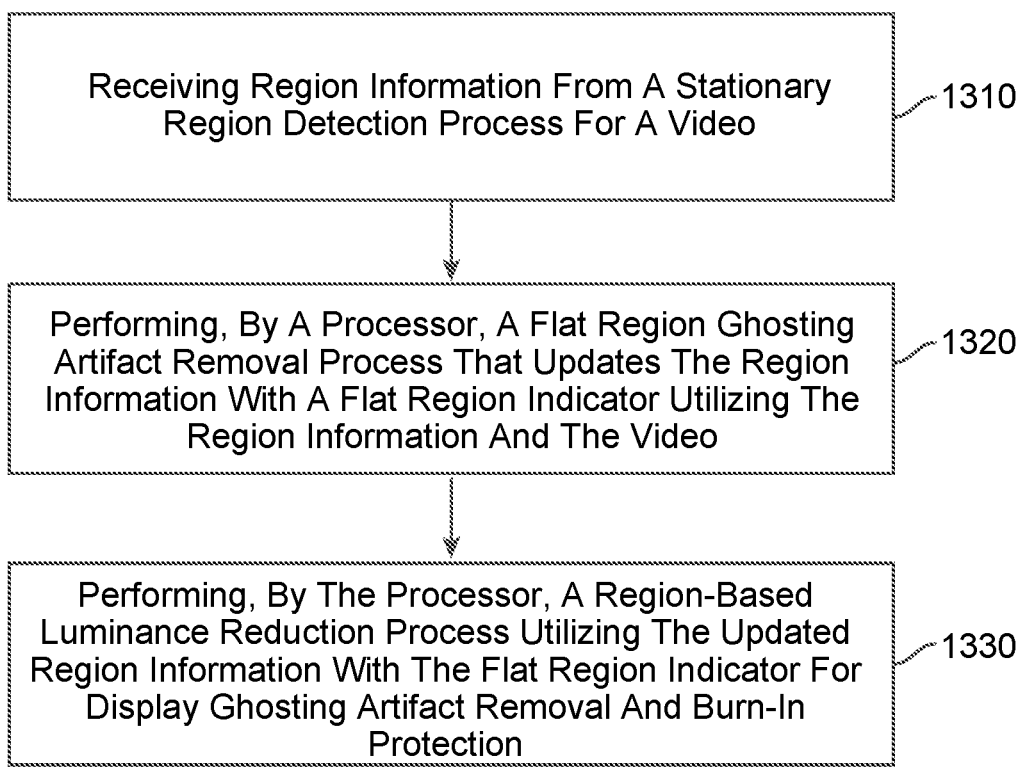
FIG. 13 illustrates a process for preventing OLED burn-in, according to some embodiments.

FIG. 13 illustrates a process 1300 for preventing OLED burn-in, according to some embodiments. In block 1310, process 1300 receives region information from a stationary region detection process 820 (FIG. 8) for a video (e.g., input video 810, FIG. 8). In block 1320, process 1300 performs, by a processor (e.g., a computing processor/multiprocessor, etc.), a flat region ghosting artifact removal process (e.g., the flat region detection process 840, FIG. 8) that updates the region information with a flat region indicator 845 (FIG. 8) utilizing the region information and the video (input video 810, FIG. 8). In block 1330, process 1300 performs, by the processor, a region based luminance reduction process 850 utilizing the updated region information with the flat region indicator 845 for display ghosting artifact removal and burn-in protection.

In some embodiments, process 1300 further provides that the region based luminance reduction process 850 includes a global flat region detection process 910 (FIG. 9).

In one or more embodiments, process 1300 further provides that the global flat region detection process 910 utilizes pixel statistics of an entire image frame of the video. In some embodiments, process 1300 additionally provides that the global flat region detection process 910 is based on maximum of red, green and blue (maxRGB) based histogram distribution for OLED burn-in prevention.

In one or more embodiments, process 1300 further provides that the region based luminance reduction process additionally includes a local flat region detection process 920 (FIG. 9) that utilizes pixel statistics of a logo region and its multiple neighboring logo regions.

In some embodiments, process 1300 additionally provides that the region based luminance reduction process includes the local flat region detection process 920 that is based on a mean absolute deviation of a logo region and its multiple neighboring logo regions for OLED burn-in prevention.

In one or more embodiments, process 1300 further provides that the multiple neighboring logo regions includes four neighboring logo regions. In some embodiments, in process 1300 upon the flat region indicator being a global flat region indicator having a first value (e.g., a flag is set to True, a bit is set to one, etc.), the local flat region detection process 920 (FIG. 9) is bypassed.

In some embodiments, process 1300 further includes that upon the global flat region indicator changing to a second value (e.g., a flag is set to False, a bit is set to zero, etc.), the region based luminance reduction process 850 (FIG. 8) executes the local flat region detection process 920 (FIG. 9). In one or more embodiments, process 1300 further provides that the display ghosting artifact removal and the burn-in protection are provided for an OLED display.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A computer-implemented method, comprising:
receiving display region information from a stationary region detection process for a video, the stationary region detection process outputs stationary region classification information for a display region based on image information for a current frame and a previous frame in the video;
performing, by a processor, a flat region ghosting artifact removal process that uses the stationary region classification information and the video for updating the display region information with a flat region indicator; and
performing, by the processor, a region based luminance reduction process utilizing the updated region information with the flat region indicator, wherein the updated display region information with the flat region indicator provides for burn-in protection.

2. The computer-implemented method of claim 1, wherein the region based luminance reduction process comprises a global flat region detection process.

3. The computer-implemented method of claim 2, wherein the global flat region detection process utilizes pixel statistics of an entire image frame of the video.

4. The computer-implemented method of claim 2, wherein the global flat region detection process is based on maximum of red, green and blue (MaxRGB) based histogram distribution for organic light emitting diode (OLED) burn-in prevention.

5. The computer-implemented method of claim 4, wherein the region based luminance reduction process further comprises a local flat region detection process that utilizes pixel statistics of a logo region and its multiple neighboring logo regions.

6. The computer-implemented method of claim 4, wherein the region based luminance reduction process further comprises a local flat region detection process that is based on a mean absolute deviation of a logo region and its multiple neighboring logo regions for the OLED burn-in prevention.

7. The computer-implemented method of claim 5, wherein the multiple neighboring logo regions includes four neighboring logo regions.

8. The computer-implemented method of claim 5, wherein upon the flat region indicator being a global flat region indicator having a first value, the local flat region detection process is bypassed.

9. The computer-implemented method of claim 8, wherein upon the global flat region indicator changing to a second value, the region based luminance reduction process executes the local flat region detection process.

10. The computer-implemented method of claim 1, wherein the updated display region information with the flat region indicator are provided for an organic light emitting diode (OLED) display.

11. A non-transitory processor-readable medium that includes a program that when executed by a processor performs prevention of organic light emitting diode (OLED) display burn-in, comprising:
receiving, by the processor, display region information from a stationary region detection process for a video, the stationary region detection process outputs stationary region classification information for a display region based on image information for a current frame and a previous frame in the video;
performing, by the processor, a flat region ghosting artifact removal process that uses the stationary region classification information and the video for updating the display region information with a flat region indicator; and
performing, by the processor, a region based luminance reduction process utilizing the updated display region information with the flat region indicator, wherein the updated display region information with the flat region indicator provides for burn-in protection.

12. The non-transitory processor-readable medium of claim 11, wherein the region based luminance reduction process comprises a global flat region detection process.

13. The non-transitory processor-readable medium of claim 12, wherein the global flat region detection process is based on maximum of red, green and blue (MaxRGB) based histogram distribution for organic light emitting diode (OLED) burn-in prevention.

14. The non-transitory processor-readable medium of claim 13, wherein the region based luminance reduction process further comprises a local flat region detection process that utilizes a mean absolute deviation of a logo region and its multiple neighboring logo regions for the OLED burn-in prevention.

15. The non-transitory processor-readable medium of claim 14, wherein:
upon the flat region indicator being a global flat region indicator having a first value, the local flat region detection process is bypassed;
upon the global flat region indicator changing to a second value, the region based luminance reduction process executes the local flat region detection process; and
the updated display region information with the flat region indicator are provided for an OLED display.

16. An apparatus comprising:
a memory storing instructions; and
at least one processor executes the instructions including a process configured to:
receive display region information from a stationary region detection process for a video, the stationary region detection process outputs stationary region classification information for a display region based on image information for a current frame and a previous frame in the video;
perform a flat region ghosting artifact removal process that uses the stationary region classification information and the video for updating the display region information with a flat region indicator; and
perform a region based luminance reduction process utilizing the updated display region information with the flat region indicator, wherein the updated display region information with the flat region indicator provides for burn-in protection.

17. The apparatus of claim 16, wherein the region based luminance reduction process comprises a global flat region detection process.

18. The apparatus of claim 17, wherein the global flat region detection process is based on maximum of red, green and blue (MaxRGB) based histogram distribution for organic light emitting diode (OLED) burn-in prevention.

19. The apparatus of claim 18, wherein the region based luminance reduction process further comprises a local flat region detection process that utilizes a mean absolute deviation of a logo region and its multiple neighboring logo regions for the OLED burn-in prevention.

20. The apparatus of claim 19, wherein:
upon the flat region indicator being a global flat region indicator having a first value, the local flat region detection process is bypassed;
upon the global flat region indicator changing to a second value, the region based luminance reduction process executes the local flat region detection process; and
the updated display region information with the flat region indicator are provided for an OLED display.

* * * * *